US012062466B2

(12) United States Patent
Lorenz

(10) Patent No.: US 12,062,466 B2
(45) Date of Patent: Aug. 13, 2024

(54) METHOD FOR MANUFACTURING A CABLE BUNDLE, FABRICATION APPARATUS FOR MANUFACTURING A CABLE BUNDLE, AND CABLE BUNDLE

(71) Applicant: Volkswagen Aktiengesellschaft, Wolfsburg (DE)

(72) Inventor: Nico Lorenz, Zwickau (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 365 days.

(21) Appl. No.: 17/385,419

(22) Filed: Jul. 26, 2021

(65) Prior Publication Data

US 2022/0037059 A1 Feb. 3, 2022

(30) Foreign Application Priority Data

Jul. 30, 2020 (DE) ..................... 10 2020 209 634.1

(51) Int. Cl.
*H01B 13/00* (2006.01)

(52) U.S. Cl.
CPC ................................ *H01B 13/0036* (2013.01)

(58) Field of Classification Search
CPC .. H01B 13/0036; H01B 13/003; H01B 13/16; H01B 13/0023; H01B 13/012; H01B 7/0045; H01B 13/01236
See application file for complete search history.

(56) References Cited

U.S. PATENT DOCUMENTS

| | | | | |
|---|---|---|---|---|
| 4,918,260 | A | 4/1990 | Griffith et al. | 174/256 |
| 7,272,284 | B1 | 9/2007 | Pluister | 385/115 |
| 10,204,717 | B2 | 2/2019 | Tsujino et al. | |
| 10,297,370 | B1 | 5/2019 | Boecker et al. | |
| 10,522,272 | B2 | 12/2019 | Peterson et al. | |
| 2011/0236614 | A1 | 9/2011 | Ushikai et al. | 428/36.1 |
| 2014/0246230 | A1 | 9/2014 | Takahashi et al. | 174/72 A |
| 2016/0072265 | A1 | 3/2016 | Shirai et al. | 138/143 |
| 2016/0343471 | A1 | 11/2016 | Ernst et al. | 174/71 R |

(Continued)

FOREIGN PATENT DOCUMENTS

| | | | | |
|---|---|---|---|---|
| CN | 205722927 U | * 11/2016 | | |
| CN | 107919189 A | 4/2018 | | H01B 11/06 |
| DE | 102014201992 A1 | 8/2015 | | H01B 11/02 |

(Continued)

OTHER PUBLICATIONS

JP-H1069821-A Machine Translation of Description (Year: 2023).*

(Continued)

*Primary Examiner* — Cynthia L Schaller
(74) *Attorney, Agent, or Firm* — Slayden Grubert Beard PLLC

(57) ABSTRACT

The invention relates to a method for manufacturing a cable bundle. At least one provided first cable is completely coated circumferentially on an outer side of the insulating sheath of the first cable with a hot-melt adhesive. In a further step, the first cable is positioned so that it touches a provided second cable over at least a partial length of the cables. In a further step, at least one local adhesive connection is produced between the first cable and the second cable along a partial length of the cables by locally melting the hot-melt adhesive on the first cable.

18 Claims, 2 Drawing Sheets

(56) References Cited

U.S. PATENT DOCUMENTS

| | | | | |
|---|---|---|---|---|
| 2020/0094533 | A1 | 3/2020 | Oomura | |
| 2020/0172027 | A1* | 6/2020 | Mizuno | H02G 3/30 |

FOREIGN PATENT DOCUMENTS

| | | | | |
|---|---|---|---|---|
| DE | 102016209624 | A1 | 12/2017 | H01B 13/06 |
| DE | 102018129129 | A1 | 5/2020 | H01B 11/02 |
| EP | 0097414 | A1 | 1/1984 | B05C 5/02 |
| EP | 3539830 | A1 | 9/2019 | B60R 13/08 |
| GB | 2237442 | A | 5/1991 | B29C 65/16 |
| JP | 02155128 | A | 6/1990 | H01B 13/00 |
| JP | H1069821 | A * | 3/1998 | |
| JP | 202024855 | A | 8/2020 | A23K 10/30 |
| JP | 2020130183 | A | 8/2020 | A23K 10/30 |
| WO | 2014/066762 | A1 | 5/2014 | C03B 37/023 |
| WO | 2020/066071 | A | 4/2020 | B60R 16/02 |

OTHER PUBLICATIONS

CN-205722927-U Machine Translation of Description (Year: 2023).*
DE 10 2018 129 129 A1 Machine Translation of Description (EPO/Google) (Year: 2023).*
German Office Action, Application No. 102020209634.1, 9 pages, Apr. 21, 2021.
Chinese Office Action, Application No. 202110870710.X, 19 pages, Nov. 30, 2023.

* cited by examiner

METHOD FOR MANUFACTURING A CABLE BUNDLE, FABRICATION APPARATUS FOR MANUFACTURING A CABLE BUNDLE, AND CABLE BUNDLE

CROSS-REFERENCE TO RELATED APPLICATIONS

This application claims priority to German Patent Application No. DE 10 2020 209 634.1, filed on Jul. 30, 2020 with the German Patent and Trademark Office. The contents of the aforesaid Patent Application are incorporated herein for all purposes.

TECHNICAL FIELD

One aspect of the teachings herein relates to a method for manufacturing a cable bundle having a first cable and at least one second cable. A further aspect relates to a fabrication apparatus for manufacturing a cable bundle. A third aspect relates to a cable bundle having a first cable and at least one second cable.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Cable harnesses and methods for manufacturing them are known. In some methods, the individual cables are fastened, spaced apart from one another, on a sheet material which serves as a carrier plate.

By contrast, cable bundles are used, in which individual cables are bundled resting directly on one another. This bundling is frequently effected with bundling ties. Positioning the cables with respect to one another is difficult. The position is not retained either. This is also disadvantageous for cable harnesses in vehicles which have cable bundles.

Manufacturing a cable bundle is therefore frequently relatively expensive and requires multiple method steps. When cables are bundled in such a way, it is only possible to predefine a position of the respective cables with respect to one another to a limited extent during the assembly itself.

SUMMARY

An object exists to provide a method for manufacturing a cable bundle having a first cable and at least one second cable, by which the cables may be arranged with respect to one another more accurately in terms of their position.

The object is solved by a method for manufacturing a cable bundle having a first cable and at least one second cable, a fabrication apparatus for manufacturing a cable bundle, and a cable bundle having a first cable and at least one second cable according to the independent claims. Embodiments of the invention are described in the dependent claims, the following description, and the drawings.

DESCRIPTION

Figure 1:
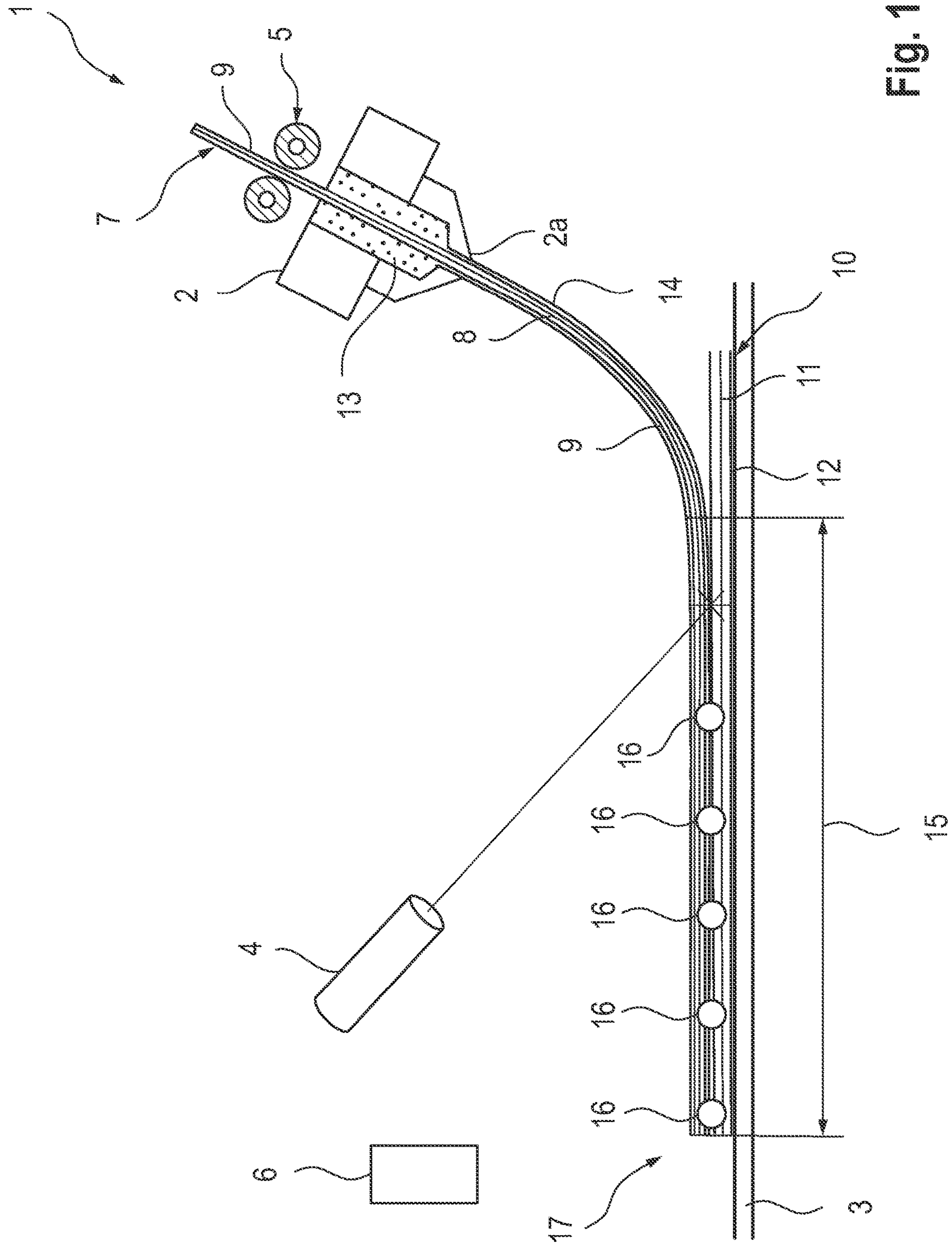
FIG. 1 shows a schematic representation of a side view of an exemplary embodiment of a fabrication apparatus for manufacturing an exemplary embodiment of a cable bundle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect relates to a method for manufacturing a cable bundle having a first cable and at least one second cable. In a first step, a first cable having a conductor and an insulating sheath completely surrounding the conductor circumferentially is provided, and a second cable separate thereto is provided. In a further step, at least the first cable is completely coated circumferentially on an outer side of the insulating sheath of the first cable with a hot-melt adhesive.

In a further step, the first cable is positioned so that it touches the second cable over at least a partial length of the cables. In a next step, at least one local adhesive connection is produced between the first cable and the second cable along the partial length of the cables by locally melting the hot-melt adhesive on the first cable and subsequently cooling the hot-melt adhesive so that the local adhesive connection holding the cables together is produced as a result, and the cable bundle having the at least two cables is manufactured.

Multiple features during the manufacture of a cable bundle may be improved by such a method. In some embodiments, a first cable may be positioned on and adhered to a second cable in a targeted manner by such a method without requiring additional clamps. In some embodiments, a movement of the cables in the cable bundle with respect to one another may be avoided. Thanks to the targeted arrangement of the cables, these may be arranged such that cables having a different cross-section may also be arranged such that the cross-section of the overall cable bundle may be reduced and, in some embodiments, a maximum possible packing density of the cross-sectional face of the cable bundle may be achieved. In some embodiments, the method may make it possible to achieve a permanent improvement in the positional accuracy of the cables with respect to one another, and to ensure that the adjusted position of the cables with respect to one another is maintained permanently. In some embodiments, the steps are performed completely automatically in a fabrication apparatus or fabrication system.

An arrangement of at least two cables which have a direct contact with one another is understood to be a cable bundle. Thus, the cable bundle may have a plurality of cables or in some embodiments more than two cables. In some embodiments, an arrangement of multiple cables may be understood to be a cable bundle so that the circumference of the cable bundle is as small as possible. In some embodiments, it may be provided that the cross-sectional face of the cable bundle forms a circular shape. In some embodiments, it may be provided that the sum of the respective cross-sectional faces of the respective cables in relation to the total cross-sectional face of the cable bundle is as large as possible, for example is close to one. In this case, this may also be referred to as a maximization of the packing density of the multiple cables in a cable bundle.

A cable is a device for transferring electrical signals and/or voltages. To this end, it is for example provided that a cable has an electrical conductor. The electrical conductor may also be described as the core of the cable. The conductor serves to transfer the signal and/or the voltage. In order to electrically insulate the electrical conductor, the latter is completely surrounded circumferentially with an insulating sheath. The insulating sheath is exemplary a plastic. In some embodiments, the insulating sheath may consist of a non-conducting material. In some embodiments, it is provided that each cable of the cable bundle has an electrical conductor and an insulating sheath.

In some embodiments, an outer side of the insulating sheath, which also forms the outer side of the cable, that is to say the side facing away from the electrical conductor, is coated with a hot-melt adhesive. In some embodiments, the outer side is coated substantially completely circumferentially. This means that the coating is applied completely circumferentially at least on a partial length of the cable. As a result, the hot-melt adhesive is applied, viewed in the circumferential direction around the longitudinal axis of the cable, with no substantial breaks and in a substantially completely closed form. It may also be provided that the cable has multiple partial portions which have a corresponding coating. For example, if the hot-melt adhesive is applied, this may also be considered an integral part of the cable. The thickness of the coating with the hot-melt adhesive may for example be equal or substantially equal in the circumferential direction around the longitudinal axis.

In some embodiments, the first cable is positioned such that it only touches the second cable on a partial length. For example, positioning the first cable such that it touches the second cable following the application of the hot-melt adhesive is to be understood to mean that at least the one coating of the first cable with the hot-melt adhesive directly touches the outer side of the insulating sheath of the second cable. It may also be provided in some embodiments that both cables have a coating with the hot-melt adhesive such that the first coating of the first cable directly touches the second coating of the second cable. In some embodiments, it may be understood that during coating of the at least one cable, the coating, e.g., the hot-melt adhesive, becomes an integral part of the respective cable. The coated cable may have an electrical conductor which is enclosed completely circumferentially by the insulating sheath. The insulating sheath may be further completely circumferentially enclosed by a coating applied to the outer side of the insulating sheath in some embodiments.

In some embodiments, a permanent adhesive connection is created along a partial length by melting the hot-melt adhesive applied to at least the first cable, which touches the second cable. For example, multiple adhesive connections are created along said partial length. For example, the adhesive connections are configured locally. The locally configured adhesive connection may also be called a glue point, for example. In some embodiments and on a partial length of the cable, on which the two cables touch, multiple adhesive connections, e.g., multiple glue points, are arranged. In some embodiments, the adhesive connections are configured spaced apart from one another.

Producing a local adhesive connection may in some embodiments comprise melting the hot-melt adhesive by introducing energy. To ensure that a sticky adhesive connection is created following the melting, the hot-melt adhesive may, e.g., be cooled.

This results in the benefit that known cables may be utilized for manufacturing a cable bundle. By positioning and subsequently melting the contact connections, a cable may be arranged so that it sticks to another cable in a simple manner. For example, the handling and the method for manufacturing the cable bundle may be simplified by the steps described above. Each cable may be positioned and stuck to another cable in a targeted manner.

The cables are thus connected directly to one another, in order to hold together, including directly, for example to hold each other. Additional carrier elements may then no longer be required. This is also a benefit of cable bundles in comparison to other embodiments, for example the known cable arrangements as mentioned in the preceding.

In some embodiments, the coating is effected by an immersion coating. For example, the cable may be guided through a coating tank, in which the melted hot-melt adhesive is located. On being guided through the coating tank, the cable may in some embodiments be uniformly coated with the hot-melt adhesive. The movement of the cable relative to the hot-melt adhesive also makes it possible to guide the cable through uniformly. As a result, a very uniform application of the hot-melt adhesive may be achieved.

In some embodiments, the local adhesive connection may be produced by a corresponding device for locally melting the hot-melt adhesive, which is then solidified again on the cable following the application thereto. For example, the energy required to melt the hot-melt adhesive may be introduced by a laser or by ultrasound.

Some embodiments provide that the cables are positioned so that they touch in such a manner that a length of a straight connecting line between a midpoint of the first cable and a midpoint of the second cable corresponds to at most 110% of the sum of the radius of the first cable up to the outer side of the insulating sheath and the radius of the second cable.

In some embodiments, the cables are positioned in such a manner and a layer thickness of the coating is correspondingly selected such that the lengths of a direct connecting line of the respective midpoints are not longer than 110% of the sum of the radii. On the one hand, this is to be understood such that the cables are arranged spaced apart with respect to one another regarding the midpoints of the cross-sectional faces such that the distance of the outer side of the insulating sheath of the first cable, which points towards the second cable, and for example the outer side of an insulating sheath of the second cable, which points towards the first cable, is at most 10% of the length of the connecting line. Reference may consequently be made to that the distance between the cables is at most 10% of the length of the connecting line, wherein this intermediate space is occupied, for example completely occupied, by the hot-melt adhesive along the connecting line. That is to say, no air space exists along said connecting line between the outer sides of the insulating sheaths. It may also be understood such that the sums of a layer thickness of the completely circumferential coating of the first cable and of the second cable is at most 10% of the length of the straight connecting line.

In some embodiments, the hot-melt adhesive layer is arranged along the connecting line. This may be understood such that the distance of the two cables from one another and the layer thickness of the hot-melt adhesive layer correspond at most to 10% of the straight connecting lines between the midpoints.

This results in the benefit that the cables are arranged with respect to one another along said connecting line so that they touch and the cables may be combined into as compact a cable bundle as possible when the local adhesive connection is produced.

Some embodiments provide that the hot-melt adhesive applied to the first cable in the radial direction of the at least one cable has at most a layer thickness of 0.5 mm. In some embodiments, the layer thickness is less than or equal to 0.3 mm. In some embodiments, the layer thickness is between greater than or equal to 0.2 mm and less than or equal to 0.3 mm.

It is provided that the hot-melt adhesive layer corresponds to the predefined layer thickness along the connecting line. It may also be provided that the layer thickness varies circumferentially in a radial direction. However, it is for example provided that the first cable has, in the circumferential direction around the longitudinal axis, a homogeneous hot-melt adhesive layer, that is to say, e.g., a hot-melt adhesive layer having a homogeneous layer thickness in this regard.

This results in the benefit that, if the layer thickness of the hot-melt adhesive is small, a more compact arrangement of the cable bundle may be attained with a simultaneously low material outlay. The cable exiting from the coating tank may then be positioned in any arrangement with respect to another cable, since it has an equal layer thickness circumferentially.

Some embodiments provide that the first cable is guided, for example as an endless product, through a coating tank such that the outer side of the insulating sheath having the hot-melt adhesive is completely coated circumferentially and, as a result, an outer sheath is produced.

A cable may be understood in some embodiments to be a (quasi) endless product or (quasi) endless cable which, at the time of the coating, has not yet been cut to the desired or the predefined length. A cable may for example be wound up onto a coil as an endless product. It may then be continually guided through the coating tank. It is only after this that it is cut to the defined lengths. For example, it the required portion of the first cable, which is part of the cable as an endless product, may be guided through a coating tank. A homogeneous circumferential coating with the hot-melt adhesive may be effected by this type of immersion coating.

This results in the benefit that, prior to the coating of the first cable, the cable does not have to be cut to the desired lengths. For example, the insertion or addition of a next cable, which is to be an integral part of the cable bundle, may thus be avoided, and the process may thus be designed to be quicker and simpler.

Some exemplary embodiments provide that, after guiding the first cable out of the coating tank and prior to cutting the first cable to the desired lengths directly from the endless product, the positioning of the first cable is performed so that it touches the second cable, for example a parallel positioning of the cables is performed so that they touch, for example prior to being cut to the desired lengths. In some embodiments, cutting to the desired lengths is carried out as the last step, especially after producing the local adhesive connections.

Cutting a cable to the desired lengths may be understood to be cutting off or separating a cable from the endless product. For example, the cable, which exists as an endless product, may be cut to a predefined cable portion. For example, it may be provided that the first cable is cut to a length of the cable bundle, for example to a length of the second cable. It would also be conceivable that the length of the first cable differs from the length of the second cable.

Some exemplary embodiments provide that, following positioning, the hot-melt adhesive is locally melted on the first cable with a laser or an ultrasound device in order to produce the adhesive connection. This makes local, very precise melting possible. For example, this does not adversely affect the insulating sheath and the conductor.

Producing adhesive connections locally results in the benefit that there is no need to produce a costly single, continuous adhesive connection along the partial length of the cable. As a result, a flexible cable bundle may also be provided after the adhesive connections are produced, without the adhesive connection being broken and/or too large mechanical stresses occurring during bending of the cable bundle.

Some exemplary embodiments provide that the at least first cable is coated with an ethylene vinyl acetate-based hot-melt adhesive.

The hot-melt adhesive may have a melting temperature between 60° Celsius and 95° Celsius.

Using an ethylene vinyl acetate-based hot-melt adhesive results in the benefit that the hot-melt adhesive has a high heat resistance and a good ageing resistance. Consequently, many and varied possible applications of a cable bundle manufactured in this way are apparent.

Some exemplary embodiments provide that at least the first cable is coated with a transparent hot-melt adhesive.

A hot-melt adhesive which transmits a wavelength of light in the spectrum visible to humans may be understood to be a transparent hot-melt adhesive. For example, a marking of the cable on the insulating sheath, which is effected in color and/or by text, may thus be visible through the hot-melt adhesive.

This results in the benefit that the marking on the outer side of the insulating sheath of the cable may be recognized and, thus, the cable may be identified, including in the cable bundle.

It may also be provided that multiple cables, wherein the first and the second cables are part of the multiple cables, are arranged in the cable bundle such that a maximum packing density is achieved, wherein the packing density is a ratio of a sum of a cross-sectional face of the multiple cables to the total cross-sectional face of the cable bundle.

It may also be provided that the first cable and the second cable are completely coated circumferentially.

Another exemplary aspect relates to a fabrication apparatus (also referred to as 'fabrication plant' or 'fabrication system' herein) for manufacturing a cable bundle, wherein the fabrication apparatus is configured to perform the method described in the preceding or any of the discussed exemplary embodiments.

Another exemplary aspect relates to a cable bundle having a first cable and at least having a second cable, manufactured in accordance with the method of the first aspect or any of the discussed exemplary embodiments thereof.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic representation of a side view of a fabrication apparatus 1 for manufacturing a cable bundle. The fabrication apparatus 1 has a coating tank 2 having an output 2*a*. The coating tank 2 is for example configured such that this has a cavity internally. For example, the coating tank 2 has the shape of a funnel in cross-section. The fabrication apparatus 1 further has a melting device 4. For example, the melting device 4 may be configured as a laser. In this case, it is provided that the laser is arranged such that the latter emits a laser beam in the direction of the supporting table 3. It may also be provided that the melting device 4 is configured as an ultrasound device.

In some embodiments, the fabrication apparatus 1 also has an insertion device 5. This is configured to supply the first cable 7 in a directed manner to an input of the coating tank 2. The fabrication apparatus 1 additionally has a control unit 6. The control unit 6 also controls the insertion device 5, for example.

A first cable 7 is shown in FIG. 1. Said first cable is to be an integral part of a cable bundle to be produced. The first cable 7 has a conductor 8 and an insulating sheath 9. The insulating sheath 9 has an outer side 9*a*.

Furthermore, a second cable 10 which is separate to the first cable 7 is provided. This second cable 10 has a conductor 11 and an insulating sheath 12 surrounding the latter. Said first cable 7 is provided here as an endless product. The first cable 7 is guided with the insertion device 5 to the coating tank 2. It is guided through the coating tank 2 and exits on the side of the output 2*a* of the coating tank 2. In the coating tank 2, a hot-melt adhesive 13 which is provided melted therein is placed onto the outer side 9*a*. After leaving the coating tank 2, the hot-melt adhesive solidifies again on the outer side 9*a*. Said coated first cable 7 is positioned on the supporting table 3 so that it touches the second cable 10 which has, in turn, an outer side 12*a* of the insulating sheath 12. Said outer side 12*a* is brought into direct contact with the hot-melt adhesive 13 on the first cable 7. Said hot-melt adhesive 13 is applied completely circumferentially on the outer side 9*a*.

The positioning may also be controlled by the control unit 6. When the first cable 7 is guided through the coating tank 2, the first cable 7 is automatically coated to its full extent with a hot-melt adhesive 13. After leaving the coating tank 2, the first cable 7 has a layer construction, from the inside out, having the following sequence: the electrical conductor 8, which is enclosed to its full extent by an insulating sheath 9 with the outer side 9*a*. On the outer side 9*a* there is located an outer sheath 14 made of hot-melt adhesive 13.

It may be provided that the coating tank 2 or the output 2*a* is positioned by the control unit 6 such that the first cable 7 is automatically positioned parallel and touching the second cable 10 on the supporting table 3. If the first cable 7 touches the second cable 10 over a predefined partial length 15, at least a local adhesive connection 16 may then also be produced. It may be provided that, following the depositing of a predefined partial length 15, a predefined local adhesive connection 16, for example multiple local adhesive connections 16, are produced without touching by the melting device 4. To this end, the melting device 4 may be actuated by the control unit 6. For example, local adhesive connections 16 may also be produced by the melting device 4 at the same time as the first cable 7 is positioned.

If the first cable 7 has been positioned on the second cable 10 over a total length of a cable bundle 17 which is to be produced, it may be provided that the first cable 7 is cut by a cutting-to-length device (not shown here). For example, it may be provided that the first cable 7 and the second cable 10 have an identical length, meaning they have the same start and end point. Thus, the first cable 7 and the second cable 10 may form the cable bundle 17. It may also be provided that the cable bundle 17 consists of more than two cables.

Figure 2:
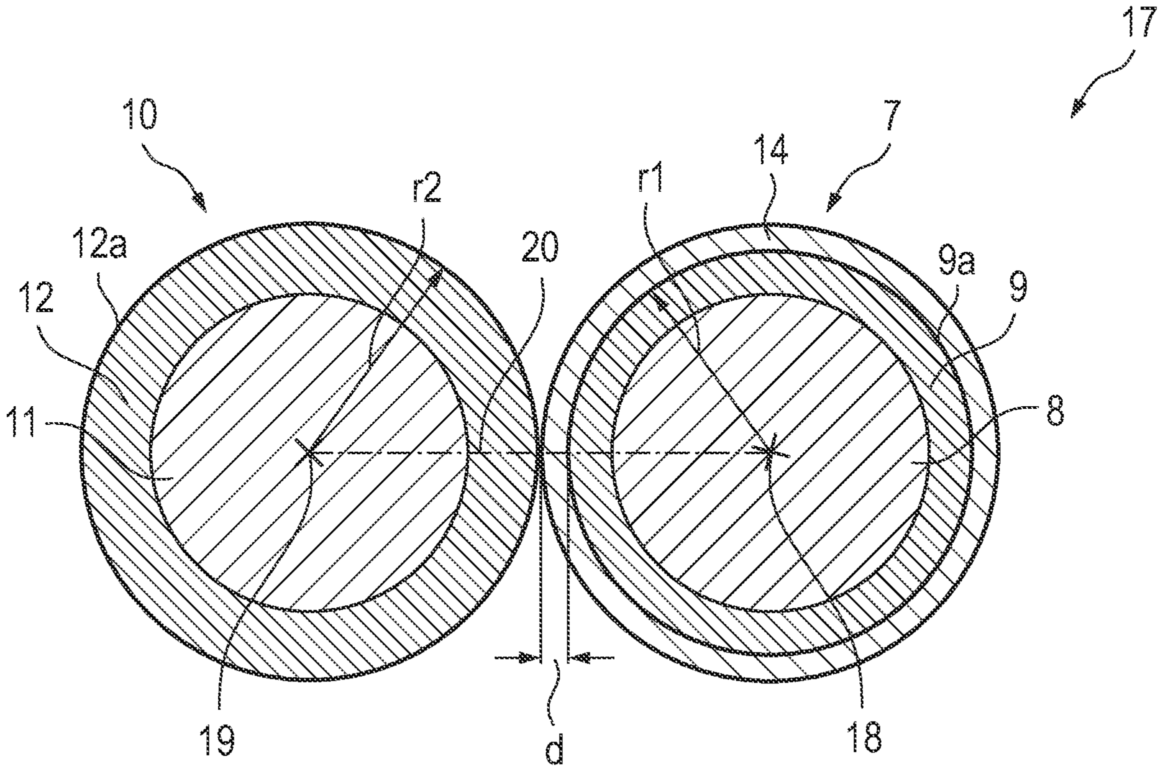
FIG. 2 shows a schematic representation of a cross-section of an exemplary embodiment of a cable bundle.

FIG. 2 shows a schematic representation of a cross-section in the axial direction of a finished cable bundle 17. In the cross-sectional view, the first cable 7 having the conductor 8, and the insulating sheath 9 having the outer side 9*a* are shown. The first cable 7 has a midpoint 18 which is located centrally in the cross-sectional face of the first cable 7, for example centrally in the cross-sectional face of the conductor 8. Starting from the midpoint 18 of the first cable, the first cable 7 has a radius r1. The radius r1 corresponds to the distance of the midpoint 18 of the first cable from the outer side 9*a* of the first cable 7. The second cable 10 having the conductor 11 and the insulating sheath 12, which has the outer side 12*a*, is arranged touching the first cable 7, for example touching the outer sheath 14 of the first cable 7. It is provided that the outer sheath 14 of the first cable 7 and the outer side 12*a* of the second cable 10 touch directly. It may also be provided that the cable 10 has an outer sheath which is not shown here. In this case, it is provided that the outer sheath of the second cable 10 directly touches the outer sheath 14 of the first cable 7. For example, it is provided that the second cable 10 also has a midpoint 19. This midpoint 19 of the second cable 10 is also located in a center of a cross-sectional face of the second cable 10, for example a cross-sectional face of the conductor 11 of the second cable 10. Starting from the midpoint 19 of the second cable 10, the cross-sectional face has a radius r2. For example, the radius r2 has a length which corresponds to the distance of the midpoint 19 of the second cable 10 from the outer side 12*a*.

The first cable 7 may for example be arranged with respect to the second cable 10 such that a direct straight-lined connecting line 20 between the midpoints 18 and 19 corresponds at most to 110% of the sum of the radii of r1 and r2. For example, it is also provided that the outer sheath 14, namely the applied hot-melt adhesive 13, has a thickness d along the connecting line 20. The length of the connecting line 20, which corresponds at most to 110% of the sum of the radii, may also be understood such that the thickness d of the outer side 9*a* of the insulating sheath 9 is at most 10% of the sum of the radii r1 and r2 along the connecting line 20 to the outer side 12*a* of the outer sheath 12 of the second cable 7 on the connecting line 20.

The thickness d is for example between 0.2 mm and 0.3 mm.

The section in FIG. 2 is outside an adhesive connection 16.

For example, a cable harness for a motor vehicle is formed by the cable bundle 17.

LIST OF REFERENCE NUMERALS

1 Fabrication apparatus
2 Coating tank

2*a* Output
3 Supporting table
4 Melting device
5 Insertion device
6 Control unit
7 First cable
8 Conductor
9 Insulating sheath
9*a* Outer side
10 Second cable
11 Conductor
12 Insulating sheath
12*a* Outer side
13 Hot-melt adhesive
14 Outer sheath
15 Partial length
16 Local adhesive connection
17 Cable bundle
18 Midpoint
19 Midpoint
20 Connecting line
r1, r2 Radius
d Thickness The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for manufacturing a cable bundle having a first cable and at least one second cable, comprising:

positioning the at least one second cable on a support surface;

providing the first cable, having a conductor and an insulating sheath completely surrounding the conductor circumferentially;

guiding the first cable through a coating tank to coat the first cable circumferentially on an outer side of the insulating sheath of the first cable with a hot-melt adhesive;

guiding a coated length of the first cable, having passed through the coating tank, to a position adjacent and parallel to the at least one second cable over at least a partial length of the at least one second cable, wherein the coated length of the first cable remains connected to an uncoated length of the first cable not having passed through the coating tank;

after guiding the coated length of the first cable to the position adjacent and parallel to the at least one second cable:

producing more than two localized adhesive connections between the coated length of the first cable and the at least one second cable at spaced-apart locations along the partial length of the at least one second cable by locally melting and subsequently cooling the hot-melt adhesive on the first cable at the spaced-apart locations; and cutting the coated length of the first cable that is adjacent and parallel to the at least one second cable from a remaining length of the first cable including at least the uncoated length of the first cable.

2. The method of claim 1, wherein the first cable touches a respective second cable of the at least one second cable such that a length of a straight connecting line extending from a midpoint of the first cable to a midpoint of the respective second cable is at most 110% of a sum of a radius of the first cable up to the outer side of the insulating sheath and a radius of the respective second cable.

3. The method of claim 2, wherein the hot-melt adhesive applied to the first cable has at most has a layer thickness of less than or equal to 0.5 mm.

4. The method of claim 2, wherein the hot-melt adhesive applied to the first cable has a layer thickness of less than or equal to 0.3 mm.

5. The method of claim 2, wherein the hot-melt adhesive applied to the first cable has a layer thickness in a range of 0.2 mm to 0.3 mm.

6. The method of claim 2, comprising guiding the first cable through the coating tank as an endless product.

7. The method of claim 2, comprising after guiding the coated length of the first cable to the position adjacent and parallel to the at least one second cable, melting the hot-melt adhesive locally on the first cable with a laser or an ultrasound device to produce the adhesive connections.

8. The method of claim 1, wherein the hot-melt adhesive applied to the first cable has a layer thickness of less than or equal to 0.5 mm.

9. The method of claim 8, comprising guiding the first cable through the coating tank as an endless product.

10. The method of claim 8, comprising after guiding the coated length of the first cable to the position adjacent and parallel to the at least one second cable, melting the hot-melt adhesive locally on the first cable with a laser or an ultrasound device to produce the adhesive connections.

11. The method of claim 1, comprising after guiding the coated length of the first cable to the position adjacent and parallel to the at least one second cable, melting the hot-melt adhesive locally on the first cable with a laser to produce the adhesive connections.

12. The method of claim 1, wherein the hot-melt adhesive comprises ethylene vinyl acetate.

13. The method of claim 1, wherein the hot-melt adhesive is transparent.

14. The method of claim 1, wherein the hot-melt adhesive applied to the first cable has a layer thickness of less than or equal to 0.3 mm.

15. The method of claim 1, wherein the hot-melt adhesive applied to the first cable has a layer thickness in a range of 0.2 mm to 0.3 mm.

16. The method of claim 1, comprising solidifying the hot-melt adhesive on the coated length of the first cable.

17. The method of claim 1, wherein the cutting of the first cable is performed after producing the more than two localized adhesive connections, such that the localized adhesive connections are produced while the coated length of the first cable remains connected to the uncoated length of the first cable not having passed through the coating tank.

18. The method of claim 1, wherein the cutting of the first cable is performed before producing the more than two localized adhesive connections.

* * * * *